(12) United States Patent
Bouzaraa et al.

(10) Patent No.: US 11,017,509 B2
(45) Date of Patent: May 25, 2021

(54) METHOD AND APPARATUS FOR GENERATING HIGH DYNAMIC RANGE IMAGE

(71) Applicant: Huawei Technologies Co., Ltd., Shenzhen (CN)

(72) Inventors: Fahd Bouzaraa, Munich (DE); Onay Urfalioglu, Munich (DE); Ibrahim Halfaoui, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 16/448,662

(22) Filed: Jun. 21, 2019

(65) Prior Publication Data

US 2019/0318460 A1    Oct. 17, 2019

Related U.S. Application Data

(63) Continuation of application No. PCT/EP2016/082388, filed on Dec. 22, 2016.

(51) Int. Cl.
| G06T 5/00 | (2006.01) |
| G06T 5/10 | (2006.01) |
| G06T 5/50 | (2006.01) |

(52) U.S. Cl.
CPC ............... *G06T 5/008* (2013.01); *G06T 5/10* (2013.01); *G06T 5/50* (2013.01);
(Continued)

(58) Field of Classification Search
None
See application file for complete search history.

(56) References Cited

U.S. PATENT DOCUMENTS

| 2012/0293685 A1 | 11/2012 | Garten |
| 2013/0028509 A1 | 1/2013 | Moon et al. |

(Continued)

FOREIGN PATENT DOCUMENTS

| CN | 101072303 A | 11/2007 |
| CN | 102905058 A | 1/2013 |

(Continued)

OTHER PUBLICATIONS

Gonzales et al, "Digital Image Processing (3rd Edition)," pp. 1-976, New Jersey: Prentice Hall (2006).

(Continued)

*Primary Examiner* — Leon Viet Q Nguyen
(74) *Attorney, Agent, or Firm* — Leydig, Voit & Mayer, Ltd.

(57) ABSTRACT

A method and an apparatus for generating a High Dynamic Range, HDR, image are proposed. The method comprises obtaining a set of two or more input images, the two or more input images including a reference image and one or more non-reference images; for each of the one or more non-reference images, performing an image analysis which comprises, for each region of a plurality of regions of the non-reference image, assessing whether the region of the non-reference image and a corresponding region of the reference image show the same image content and declaring the region of the non-reference image as valid or as invalid based on the assessment; and generating the HDR image by fusing the reference image and the one or more non-reference images, wherein the fusing comprises, for each of the one or more non-reference images, disregarding the invalid regions of the respective non-reference image.

13 Claims, 8 Drawing Sheets

(52) U.S. Cl.
CPC ............... *G06T 2207/20208* (2013.01); *G06T 2207/20221* (2013.01); *G06T 2207/20224* (2013.01)

(56) References Cited

U.S. PATENT DOCUMENTS

| | | | |
|---|---|---|---|
| 2013/0070965 | A1 | 3/2013 | Jang et al. |
| 2013/0314568 | A1* | 11/2013 | Vranceanu ............... G06T 5/40 348/239 |
| 2014/0307960 | A1* | 10/2014 | Sharma ............ H04N 5/23229 382/162 |
| 2015/0002704 | A1 | 1/2015 | Vidal-Naquet |
| 2015/0078661 | A1* | 3/2015 | Granados ............... G06T 5/009 382/167 |
| 2015/0161797 | A1 | 6/2015 | Park et al. |
| 2016/0093029 | A1* | 3/2016 | Micovic .................... G06T 1/20 348/229.1 |
| 2016/0364847 | A1 | 12/2016 | Bouzaraa et al. |
| 2019/0297247 | A1 | 9/2019 | Yang |

FOREIGN PATENT DOCUMENTS

| | | |
|---|---|---|
| CN | 104349066 A | 2/2015 |
| CN | 104702852 A | 6/2015 |
| CN | 106030653 A | 10/2016 |
| CN | 106161979 A | 11/2016 |
| WO | 2015124212 A1 | 8/2015 |

OTHER PUBLICATIONS

Fischler et al, "Random Sample Consensus: A Paradigm for Model Fitting with Applications to Image Analysis and Automated Cartography," Communications of the ACM, vol. 24, No. 6, pp. 381-395, Graphic and Image Processing (1981).

Enhong et al., "Method of Generating High Dynamic Range Image from a Single Image," Journal of Computer-Aided Design and Computer Graphics, vol. 28 No. 10, pp. 1713-1722 (Oct. 2016). with English abstract.

Khan et al., "Ghost Removal in High Dynamic Range Images," in IEEE International Conference on Images Processing, pp. 2005-2008, Institute of Electrical and Electronics Engineers—New York, New York (2006).

Gallo et al., "Artifact-free High Dynamic Range Imaging," in IEEE International Conference on Computational Photography, pp. 1-7, Institute of Electrical and Electronics Engineers—New York, New York (2009).

An et al., "A MultiExposure Image Fusion Algorithm Without Ghost Effect," in IEEE International Conference on Acoustics, Speech and Signal Processing, pp. 1565-1568, Institute of Electrical and Electronics Engineers - New York, New York (2011).

Pece et al., "Bitmap Movement Detection: HDR for Dynamic Scenes," pp. 1-8, Conference on Visual Media Production(2010).

An et al., "Probabilistic Motion Pixel Detection for the Reduction of Ghost Artifacts in High Dynamic Range Images from Multiple Exposures," pp. 1-15, Eurasip Journal on Image and Video Processing (2014).

Gonzalez et al., "Digital Image Processing (3rd Edition)," pp. 1-976, New Jersey:Prentice Hall (2006).

Vincent et al., "Detecting Planar Homographies in an Image Pair," pp. 182-187, Proceedings of the 2nd International Symposium on Image and Signal Processing and Analysis (2001).

Bay et al., "Surf: Speeded Up Robust Features," Research Gate, pp. 1-14, Conference Paper (Jul. 2006).

* cited by examiner

METHOD AND APPARATUS FOR GENERATING HIGH DYNAMIC RANGE IMAGE

CROSS-REFERENCE TO RELATED APPLICATIONS

This application is a continuation of International Application No. PCT/EP2016/082388, filed on Dec. 22, 2016, the disclosure of which is hereby incorporated by reference in its entirety.

TECHNICAL FIELD

The present application refers to an apparatus and a method for generating a high dynamic range image from at least two input images.

Particularly, the present application refers to an apparatus and a method which generates a high dynamic range image and which involves detecting dynamic pixels in one or more of the input images.

BACKGROUND

High Dynamic Range Imaging (HDRI) and Exposure Fusion (EF) are methods of choice to computationally extend the dynamic range of images depicting real world scenes. Unfortunately, those methods are still prone to certain artifacts. Among others, the so-called Ghost Effect is the most critical HDR limitation when it comes to dealing with motion (camera or scene motion) in input Low Dynamic Range (LDR) images.

In case of Exposure Fusion (EF), the input images are merged using weighting maps which evaluate the saturation, exposedness and contrast of the LDRs. This technique is based on the assumption that the input-LDRs are aligned (static scene). However, real world scenes are mostly dynamic and contain moving objects. This results in Ghost Effects, where objects appear in several locations in the final image.

This problem becomes more challenging when the input image stack contains only a few images with large color differences, which is the case in the mobile phone domain. To address this issue, a de-ghosting step is required to preserve the quality of the final HDR images.

There exists a lineup of deghosting methods based on motion-maps which indicate the location of corresponding dynamic pixels. These methods perform generally well when the input stack offers a large number of differently exposed LDRs. In case of two input images with large illumination difference, these methods generally fail.

SUMMARY

The object of some embodiments of the present application is therefore to provide a robust de-ghosting approach that performs efficiently in many cases, in particular when only a few (e.g., two or three) differently exposed images are available as input, also when these images exhibit large illumination variations.

A first aspect of the present application provides a method for generating a High Dynamic Range (HDR) image, comprising:

obtaining a set of two or more input images, the two or more input images including a reference image and one or more non-reference images;

for each of the one or more non-reference images, performing an image analysis which comprises, for each region of a plurality of regions of the non-reference image, assessing whether that region of the non-reference image and a corresponding region of the reference image show the same image content and declaring that region of the non-reference image as valid or as invalid based on that assessment; and generating the HDR image by fusing the reference image and the one or more non-reference images, wherein the fusing comprises, for each of the one or more non-reference images, disregarding the invalid regions of the respective non-reference image.

The image analysis notably comprises:

generating a difference image of the non-reference image by subtracting the non-reference image from the reference image or vice versa (i.e., subtracting the reference image from the non-reference image); and generating a contrast-enhanced difference image by applying a contrast enhancing transformation to the difference image.

The assessing is done on the basis of the contrast-enhanced difference image.

A second aspect of the present invention provides an apparatus for generating an HDR image, comprising a processor, wherein the processor is configured to:

obtain a set of two or more input images, the two or more input images including a reference image and one or more non-reference images;

for each of the one or more non-reference images, perform an image analysis which comprises, for each region of a plurality of regions of the non-reference image, assessing whether that region of the non-reference image and a corresponding region of the reference image show the same image content and declaring that region of the non-reference image as valid or as invalid based on that assessment; and generate the HDR image by fusing the reference image and each of the one or more non-reference images, wherein the fusing comprises, for each of the one or more non-reference images, disregarding the invalid regions of the respective non-reference image.

The image analysis further comprises:

generating a difference image of the non-reference image by subtracting the non-reference image from the reference image or vice versa; and generating a contrast-enhanced difference image by applying a contrast enhancing transformation to the difference image;

wherein the processor is configured to perform the assessing on the basis of the contrast-enhanced difference image.

A third aspect of the present invention provides a computer program with program code means for performing the method according to the first aspect if the program is executed on a computer or a digital signal processor is provided.

A fourth aspect of the present invention provides a computer program product having a computer readable medium with stored program code means for performing the method according to the first aspect if the program is executed on a computer or a digital signal processor is provided.

DESCRIPTION OF THE EMBODIMENTS

Illustrative embodiments of method, apparatus, and program product for generating a HDR (High Dynamic Range) image are described with reference to the figures. Although this description provides a detailed example of possible implementations, it should be noted that the details are intended to be exemplary and in no way limit the scope of the application.

Moreover, an embodiment/example may refer to other embodiments/examples. For example, any description including but not limited to terminology, element, process, explanation and/or technical advantage mentioned in one embodiment/example is applicative to the other embodiments/examples.

For convenience of illustration, abbreviations and terms listed below may be used in the following embodiments of this invention as examples instead of limitations.

HM—Histogram Matching
HDR—High Dynamic Range
HDRI—High Dynamic Range Imaging
LDR—Low Dynamic Range
OF—Optical Flow
CRF—Camera Response Function
EF—Exposure Fusion image—a visual representation of a real world or synthetic scene by a digital camera; also referred to as picture.

pixel—the smallest addressable picture/image element.

window—a rectangular block of pixels extracted from an image.

color mapping—(also known as color calibration, color matching) is the operation of mapping the colors of an image (source image) to the colors of another image (reference image).

Image Histogram—Graphical illustration of the distribution of the pixel color intensities of an image.

reference image—LDR image which belongs to the input stack of images. The final HDR image is a modified version of the reference image which has a wider dynamic range.

exposure—describes the amount of light gathered by the capturing device (camera . . . ). A low-exposed image appears to be dark and a high-exposed image appears to be bright.

dynamic Pixel—image pixel which belongs to a different part of the captured scene, in comparison to a pixel with the same pixel coordinates inside the reference image. Dynamic pixels typically belong to motion objects. A dynamic pixel may also be called motion pixel.

motion map—binary map which indicates the locations of dynamic pixels in the corresponding non-reference image, in comparison to the reference image.

Ghost-effect—type of image noise (artifact) in a HDR image which results from merging several non-aligned input images (non-aligned due to camera or scene motion). Motion-related objects are depicted multiple times in the HDR, which create the ghost effect.

Figure 1:
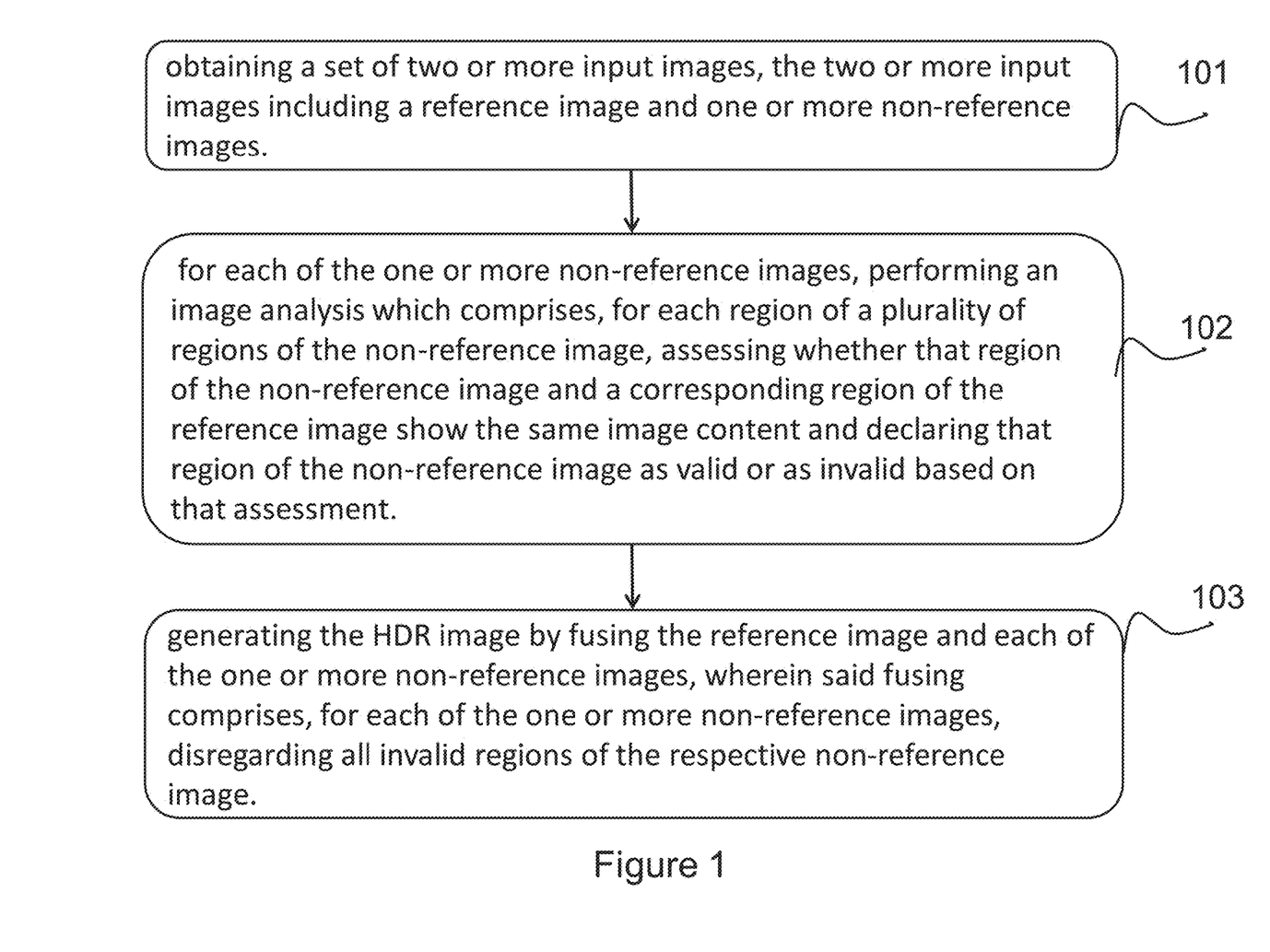
FIG. 1 is a schematic flowchart of method for generating a HDR image according to an embodiment of the present application.

The flowchart in FIG. 1 schematically illustrates a method for generating a HDR image according to an embodiment. The method comprises steps 102 to 103.

Step 101, obtaining a set of two or more input images, the two or more input images including a reference image and one or more non-reference images.

The input images are differently exposed images of a scene.

The input images may be obtained by receiving from a device or network accessible to an apparatus that carries out this method. The input images may also be obtained by generating by the apparatus. For example, the apparatus may generate the input images using its camera.

Step 102, for each of the one or more non-reference images, performing an image analysis which comprises, for each region of a plurality of regions of the non-reference image, assessing whether that region of the non-reference image and a corresponding region of the reference image show the same image content and declaring that region of the non-reference image as valid or as invalid based on that assessment.

A region may be a pixel or a group of pixels.

Two regions of two images show the same image content if a region in a first image and a region in a second image that is geometrically identical to the first image correspond to each other. Two regions correspond to each other if the regions are identical in shape, size, and position relative to the image corners.

The image analysis may further comprise the following sub-steps: (102a) generating a difference image of the non-reference image by subtracting the non-reference image from the reference image or by subtracting the non-reference image from the reference image; and (102b) generating a contrast-enhanced difference image by applying a contrast enhancing transformation to the difference image. In this case, the assessing above is on the basis of the contrast-enhanced difference image.

In sub-step 102b, the process of applying the contrast enhancing transformation comprises: for each region of a plurality of regions of the difference image, applying a sigmoid function to an intensity value of the region. The sigmoid function may, for example, be a logistic function.

An example of assessing whether that region of the non-reference image and a corresponding region of the reference image show the same image content comprises: comparing an intensity value of a corresponding region of the difference image against a threshold.

Optionally, prior to performing the image analysis, the following step may be performed:

For each of the one or more non-reference images, performing an exposure transformation of the non-reference image or an exposure transformation of the reference image prior to performing the image analysis, to reduce an overall color or brightness difference between the non-reference image and the reference image.

Optionally, the contrast enhancing transformation may be adapted according to a control parameter, such as a characteristic of the reference image and the non-reference image. The characteristic may include a color difference between the reference image and the non-reference image.

Step 103, generating the HDR image by fusing the reference image and each of the one or more non-reference images. The fusing comprises, for each of the one or more non-reference images, disregarding the invalid regions of the respective non-reference image.

The disregarding may be performed, for example, by assigning a weight of zero to every invalid region.

The threshold in step 102 may be determined based on the non-reference image by following sub-steps 102*i*-102*iv*:

102*i*, generating a histogram of the non-reference image, wherein the histogram includes multiple bins and each of the multiple bins covers a same range of intensity and has a bin center;

102*ii*, calculating a decrease of each bin of the multiple bins, wherein the decrease is a difference between numbers of pixels respectively at centers of two adjacent bins of the multiple bins;

102*iii*, identifying a bin from the multiple bins, wherein decrease of the identified bin is larger than decrease of any non-identified bin of the multiple bins; and

102*iv*, calculating the threshold according to intensity of a point in the middle of two bin centers of the identified bin and its next bin.

Optionally, the image analysis in step 102 may further comprise a morphology operation on the invalid regions of the respective non-reference image. The morphology operation may include:

counting the invalid pixels inside a first window in the contrast-enhanced image, wherein the first window is centered on an invalid pixel; and declaring the invalid pixel on which the first window is centered as valid or invalid according to the counted number of invalid pixels inside the first window;

and/or defining a second window next to an invalid pixel in the contrast-enhanced image; and declaring every pixel inside the second window as invalid if a central pixel of the second window is an invalid pixel.

A dynamic pixel is an invalid pixel. Correspondingly, a static pixel is a valid pixel.

This method provides for HDR de-ghosting based on a simple yet very accurate algorithm for image analysis. The approach allows for greater color difference (different exposures) as well as a small stack of input images.

Figure 2A:
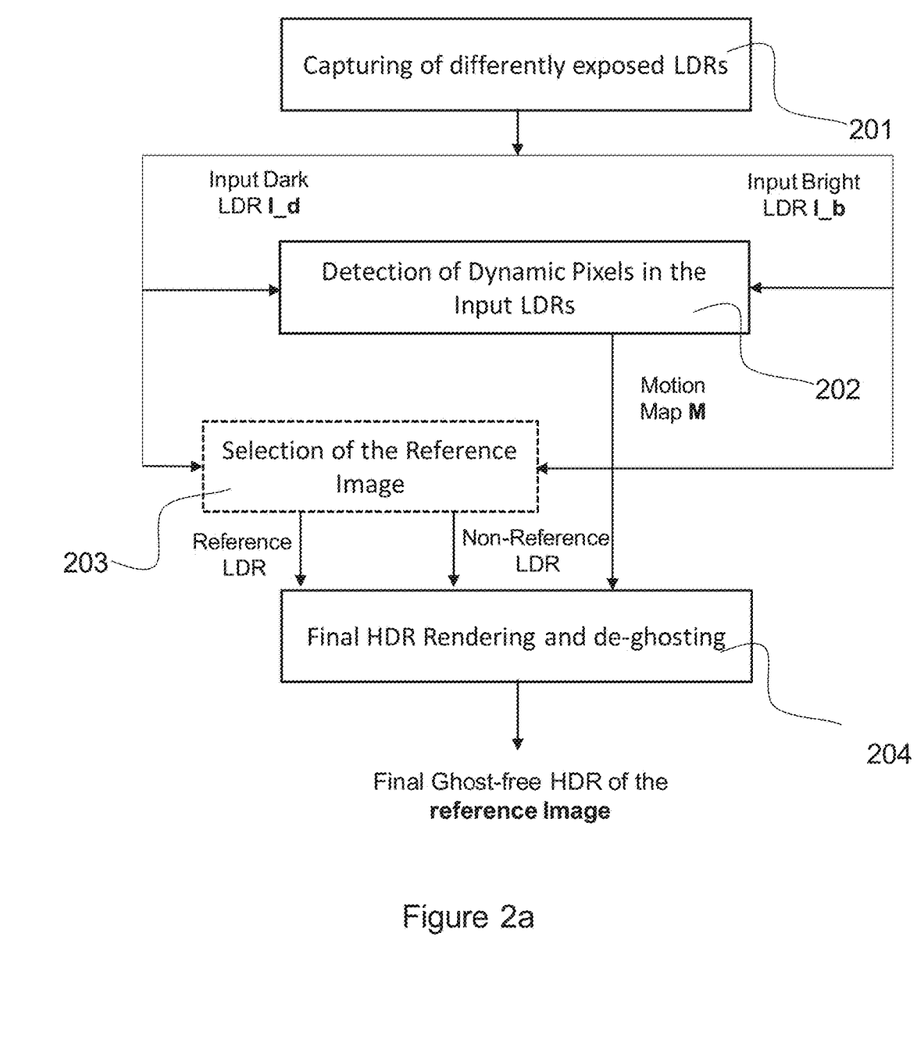
FIG. 2a is an example of the aforementioned embodiment.

FIG. 2*a* illustrates an example of the aforementioned embodiment. In this example, a pair of input images is processed. It should be noted that this example will also work with more than two input images.

Step 201, obtaining a pair of LDR images b and d.

Image b is a bright LDR, i.e. a LDR generated with long-exposure. Image d is a dark LDR, i.e. a LDR generated with short-exposure.

The images b and d exhibit scene differences and/or content differences. Scene differences are generally related to camera-motion or the nature of the capturing setup (Stereo/Multi-camera setup). Content differences are caused by moving objects.

The input images may be obtained in different ways as described in the aforementioned step 101. In case of using a camera, the input images can be captured simultaneously by using a stereo/Multi-camera setup or sequentially by the same camera with additional temporal dimension.

Step 202, detecting dynamic pixels in the input images to generate a motion map M.

The dynamic pixels in the input images are related to scene and/or camera motion.

The motion map is a binary mask, composed of zeros and ones. Zero indicates a dynamic pixel, and one indicates a non-motion (static) pixel. A dynamic pixel is invalid and a static pixel is valid.

The process of detecting and generating the motion map is an example of the image analysis in the aforementioned step 102. Accordingly, the motion map in step 202 is an example of the result obtained after performing the sub-step of declaring the respective region of the non-reference image as valid (non-motion or static) or as invalid (dynamic or motion) in the aforementioned step 102.

Step 203, designating one of images b and d as a reference image.

In case of more than two input images, the reference image is designated before step 202. In this case, step 203 can be omitted since it has been already done before step 202.

Step 204, generating a final HDR image based on the motion map and the reference image by using a modified version of Exposure Fusion.

The final HDR represents a version of the reference LDR with an extended dynamic range.

The motion map M is used to modify the exposure fusion algorithm by including it (or motion maps in case of more than 2 LDRs) into the weighting maps (Wi(p) below) of the input images:

$$W_i(p)=(C_i(p))^{\omega_C}\times(S_i(p))^{\omega_S}\times(E_i(p))^{\omega_E}\times M_i(p)$$

where Ci(p) is the contrast map for image i at pixel p, Si(p) is the saturation map, Ei(p) is the exposedness map. The parameters wc, ws and we represent the corresponding power values. M1($p$) is the previously computed motion map of the image i. Image i may be Image b or d. In the case of two input images, the motion map corresponding to the designated reference image is composed of ones ("1") since the motion map of the reference image indicate that all pixels are valid pixels. A valid pixel is a static pixel (non-motion pixel) and is indicated by "1". Otherwise, "0" indicates a dynamic pixel (motion pixel).

The computed motion map M is assigned to the non-reference image. In the case of more than two input images, the weighting maps of the non-reference images are set to zero for motion related areas according to the equation, so that these pixels are excluded from the final HDR image.

Figure 2B:
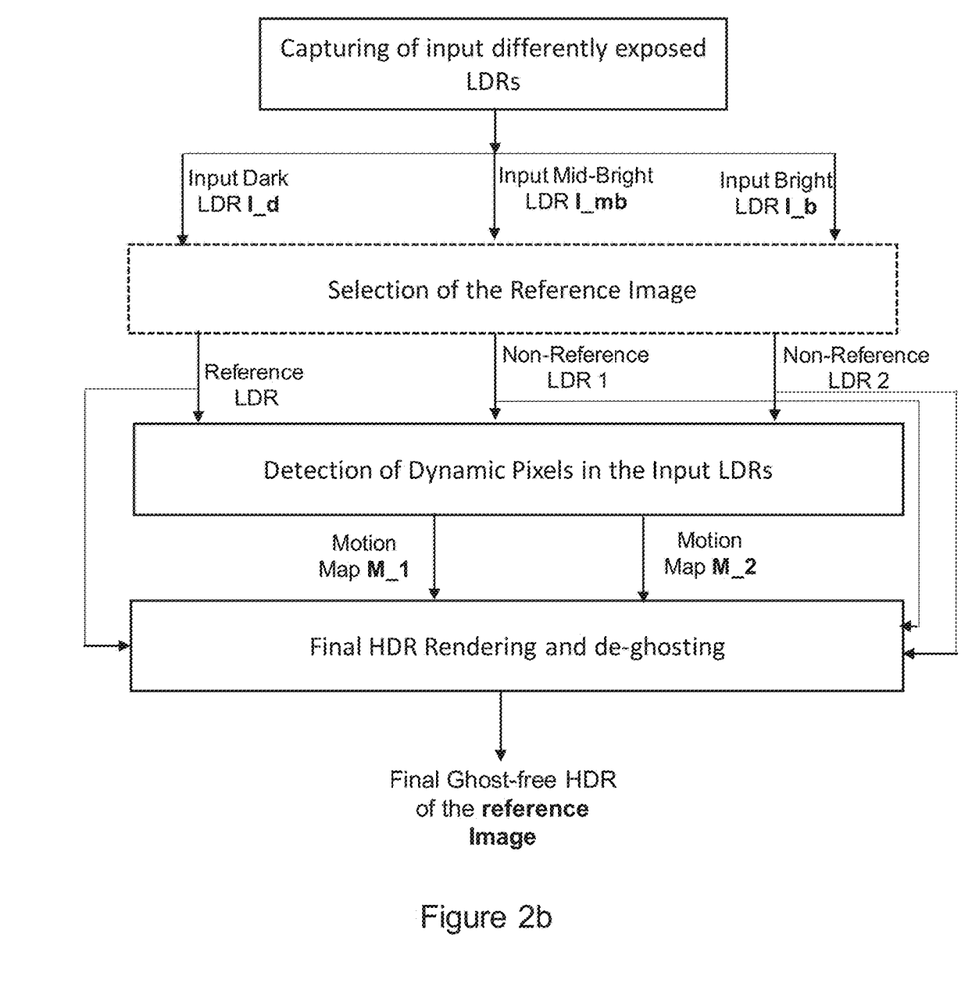
FIG. 2b is another example of the aforementioned embodiment.

As mentioned above, step 203 may be performed before step 202 if there are more than two input images. Once the reference image is selected, the algorithm in steps 202 and 204 applies on every pair of reference and non-reference LDRs. In case of N input images, the algorithm computes (N−1) motion maps, which will be integrated, again as described earlier, into the final weighting maps during the exposure fusion stage. These steps are summarized in FIG. 2*b*.

Figure 3:
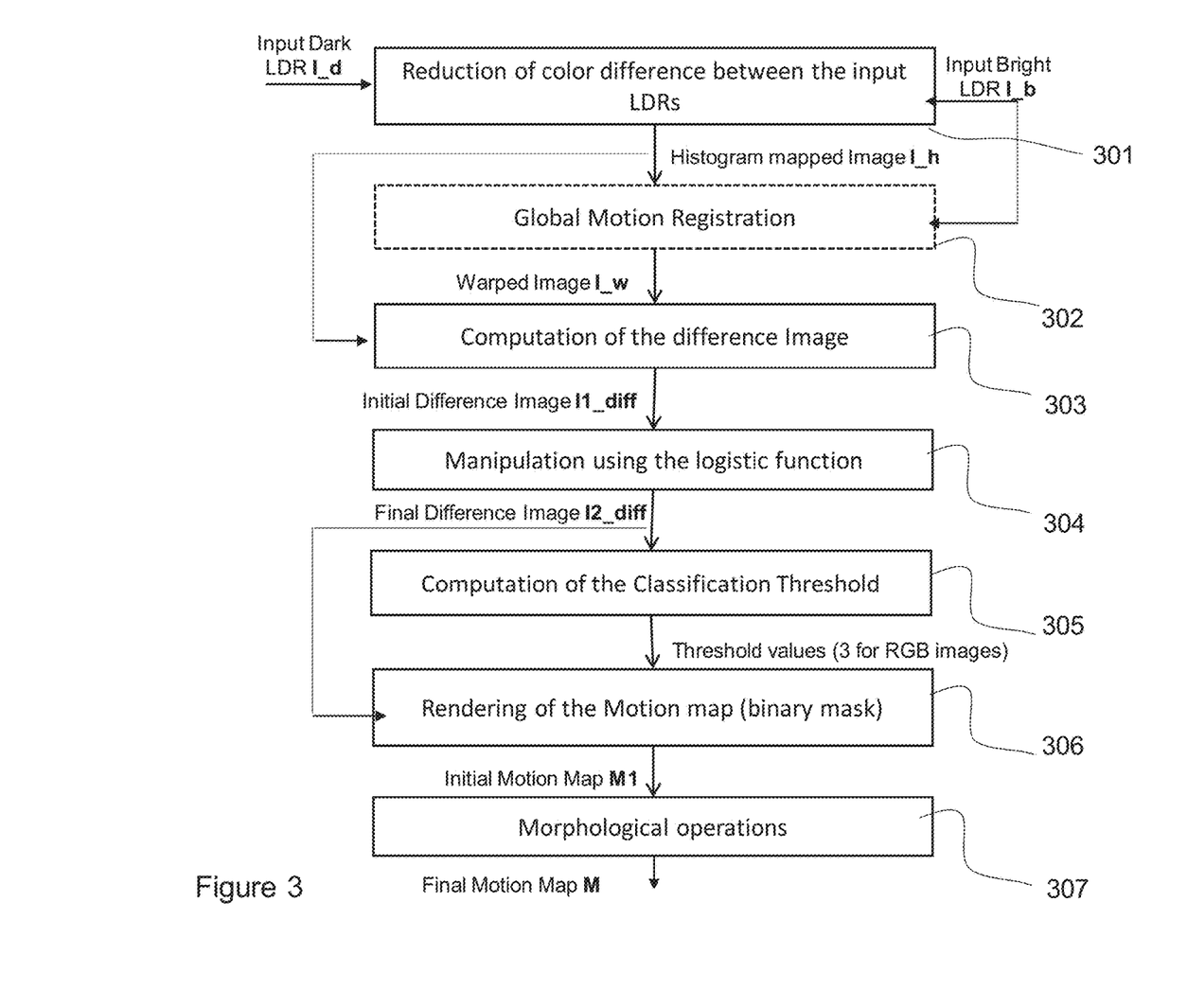
FIG. 3 is a flowchart of generating a motion map according to an embodiment of the present application.

FIG. 3 is a schematic flowchart of step 202 according to another embodiment of the present application. The underlying idea of the proposed motion detection algorithm is to explore the difference image between image b and image d. There may be a large color difference between Image b and image d that needs to be reduced.

Step 301, generating a transformed image h based on images b and d.

Image h has the same color properties as image b while has the same content of image d, color difference between images b and d is reduced.

Image h may be generated by using color mapping, such as Histogram Matching (HM). HM is a low-complexity algorithm which matches the Cumulative Distribution Function (CDF) of a source image to the CDF of a target image with the desired color distribution. In this embodiment, image d is considered as the source image since it contains generally less saturated areas than image b.

In case of two input images, step 301 does not influence the choice of the reference image as describe Step 203 since the transformed image h can be either assigned to image d or image b.

Step 302, warping image b to image h to obtain a warped image w.

Thereby, the content difference between images b and d is reduced.

In this step, an optional global motion registration step may be applied if the input images contain camera-related motion (translation and rotation).

This step is based on the computation of a Homography matrix H. To this end, SURF (Speeded Up Robust Features) may be used to detect and extract features in image b and image h. Moreover, RANSAC (Random sample consensus) may be used for the matching step. Alternative features detection, extraction and matching techniques might be deployed as well. Finally, image b is warped to the view of image h using the computed matrix H, resulting in an image w.

If no camera motion is detected, image w is a copy of image b.

Step 303, determining an initial difference image I1_diff on down-sampled versions of image w and image h. The initial difference image I1_diff is an example of the difference image in the aforementioned sub-step 101a.

The down-sampling step reduces color mapping noise and artifacts. During this step, a Gaussian Pyramid may be used as a low-pass filter. Additionally, the down-sampling decreases the computational cost of the algorithm. Empirically, it is sufficient to down-sample to 1 or 2 levels. The difference image is computed according to following formulation (1):

$$I1_{diff}(i,j) = |D(I_h(i,j)) - D(I_w(i,j))| \quad (1)$$

In the formulation (1), D represents the down-sampling operator and (i, j) pixel coordinates.

The difference values of I1_diff can be classified into two different classes:

(i) Difference values from motion related objects. These values are generally large and less frequent.

(ii) Difference values originating from the inherent color difference between image h and image w. These values are typically smaller and more frequent.

Step 304, determining a final difference image I2_diff by applying a contrast enhancing transformation to the initial difference image I1_diff. The final difference image I2_diff is an example of the contrast-enhanced difference image in the aforementioned sub-step 101b.

Step 304 can accurately distinguish between the previously mentioned difference values. To determine the final difference image, contrast enhancing transformation is applied to the initial difference image I1_diff. The contrast enhancing transformation may be performed by using a sigmoid function, for example the following logistic function (2):

$$I2_{diff}(i, j) = \frac{1}{1 + k_1 e^{-k_2(I_{diff}(i,j) - 0.5)}} \quad (2)$$

Where k1 and k2 are control parameters which can be set empirically according to the characteristics of the scene (e.g. number of the input images and/or color difference between the input images). For example, k1 may be set to 0.09 and k2 may be set to 12. The digit '0.5' is an example of control parameter k3 and may be replaced with other value. The control parameters k1, k2 and k3 may be set manually or automatically.

The values of k1, k2 and k3 are configured to ensure that 0 is mapped to 0 and 1 is mapped to 1. Therefore the manipulation using the logistic function is a mapping from [0,1] to [0,1] or at least approximates 0 and 1.

For example, value of k1 may be increased if the exposure ratio between the input images is quite high. In case of high exposure ratio, noisy pixels are created during the color mapping stage using HM, which implies that the algorithm used in the color mapping stage probably detected false positives. By increasing k1 in step 304, less dynamic pixels are detected and thus the noisy pixels are removed. Therefore, accuracy of the whole process is improved.

The logistic function allows for manipulating/enhancing the contrast of the difference image, so that large difference values corresponding to motion pixels are enhanced in comparison to smaller difference values. This allows for better classification of the difference values, through the accurate estimation of the classification threshold(s). The impact of this step is s shown in FIG. 4a and FIG. 4b.

Step 305, determining a threshold T_c based on the final difference image I2_diff.

The threshold is an example of the threshold in the aforementioned step 102 and may be determined by following sub-steps 305a-305d:

305a, generating a histogram of the final difference image I2_diff, wherein the histogram includes multiple bins and each of the multiple bins covers a same range of intensity and has a bin center.

305b, calculating a decrease of each bin of the multiple bins, wherein the decrease is a difference between numbers of pixels respectively at centers of two adjacent bins of the multiple bins.

305c, identifying a bin from the multiple bins, wherein decrease of the identified bin is larger than decrease of any non-identified bin of the multiple bins. This sub-step may be described as following formulation (3).

$$T_c = \arg\max_{T_c^i} |N_p(T_c^i) - N_p(T_c^{i+1})|, i = 0, \ldots, B-2 \quad (3)$$

In formulation (3), $N_p(T_c^i)$ is the number of pixels around the bin center $T_c^i$ of the bin number i out of B bins. B is the total number of the bins. The value of B may be 10 so that each bin approximately covers a range of 25 intensities.

305d, calculating the threshold according to intensity of a point in the middle of two bin centers of the identified bin and its next bin. Therefore, the threshold T_c is equal to $$\frac{T_c^{i+1} - T_c^i}{2}.$$

The threshold T_c may be determined for each color channel. These thresholds enable to distinguish between motion-related difference values and HM-related values.

Step 306, generating an initial binary motion map M1 according to the threshold and the final difference image I2_diff.

Accordingly, a pixel of the final difference image I2_diff is marked as dynamic pixel (motion pixel) if at least one difference value in I2_diff of a color channel c is larger than the corresponding threshold T_c. This results in an initial binary motion map M1, which indicates the location of the motion-pixels.

Step 307, applying morphological operation on the initial binary motion map M1 to generate a final motion map M. The final motion map M here is an example of the motion map M in the aforementioned step 202.

This operation aim at removing possible detection noise (wrongly detected pixels) and enhance the shape and filling of motion objects in the final motion map. The operation may comprise any one or both of following sub-steps 307a-307b:

307a, counting the number the invalid pixels Nw inside a first window in the initial motion map M1, wherein the first window is centered on an invalid pixel (motion pixel), and declaring the invalid pixel (motion pixel) on which the first window is centered as valid or invalid according to the counted number of invalid pixels inside the first window.

The size of the first window may be set to 3 or 5. The processing of the declaring may be done as following:

$$N_w \le \left\lfloor \frac{w^2}{2} \right\rfloor;$$

the motion pixel will be discarded, that is, is not marked as motion pixel.

if $$N_w > \left\lfloor \frac{w^2}{2} \right\rfloor;$$

the motion pixel is confirmed as a motion pixel.

307b, defining a second window next to an invalid pixel in the initial motion map M1, and declaring every pixel inside the second window as invalid if a central pixel of the second window is an invalid pixel. Likewise, the size of the second window may also be set to 3 or 5.

The morphological operation enables to fill-up possible missing motion-pixels inside motion objects, and thus improves the shape of these objects in the final motion map M.

Figure 4A:
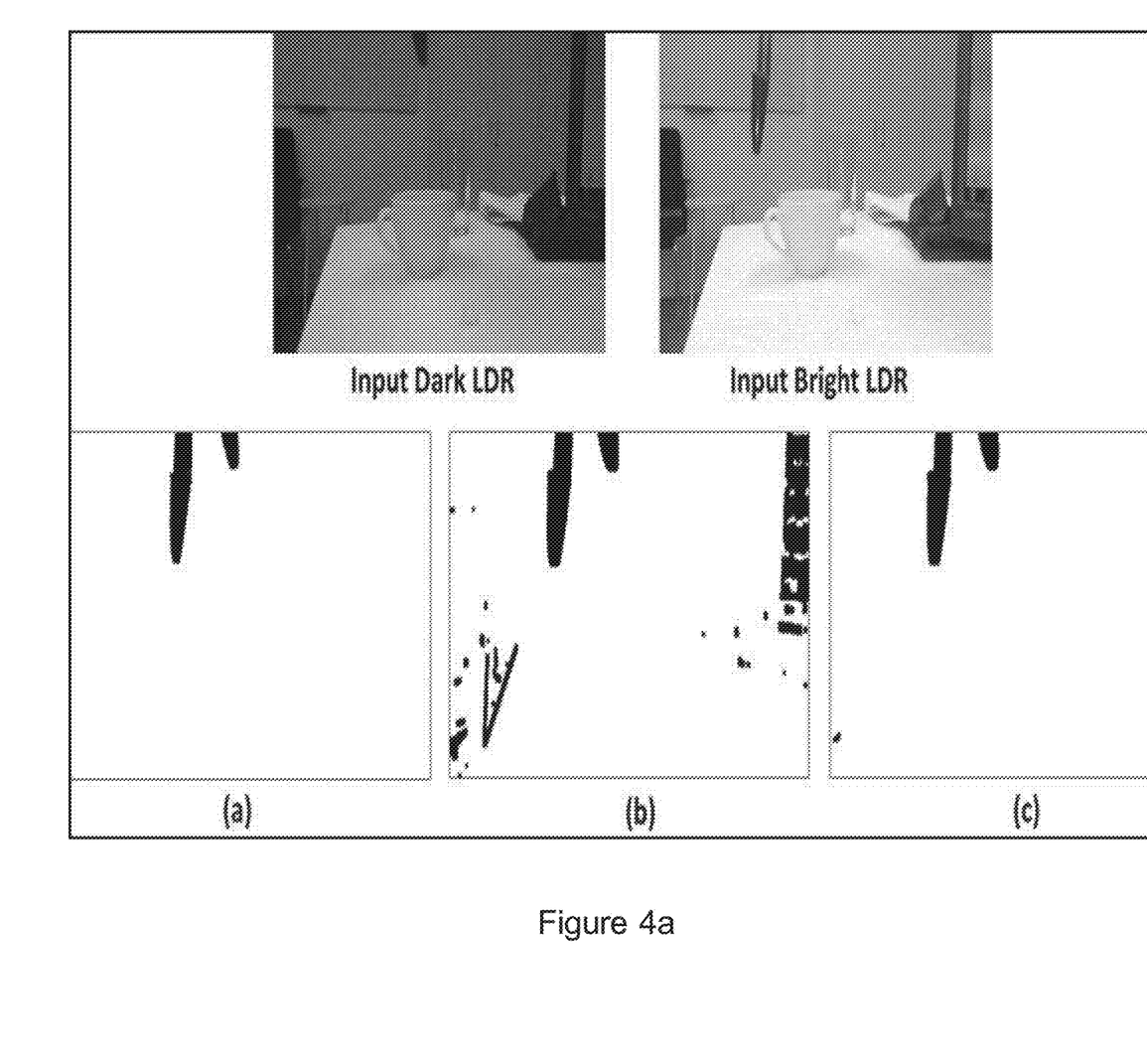
FIG. 4a is an example of a final motion map M.
Figure 4B:
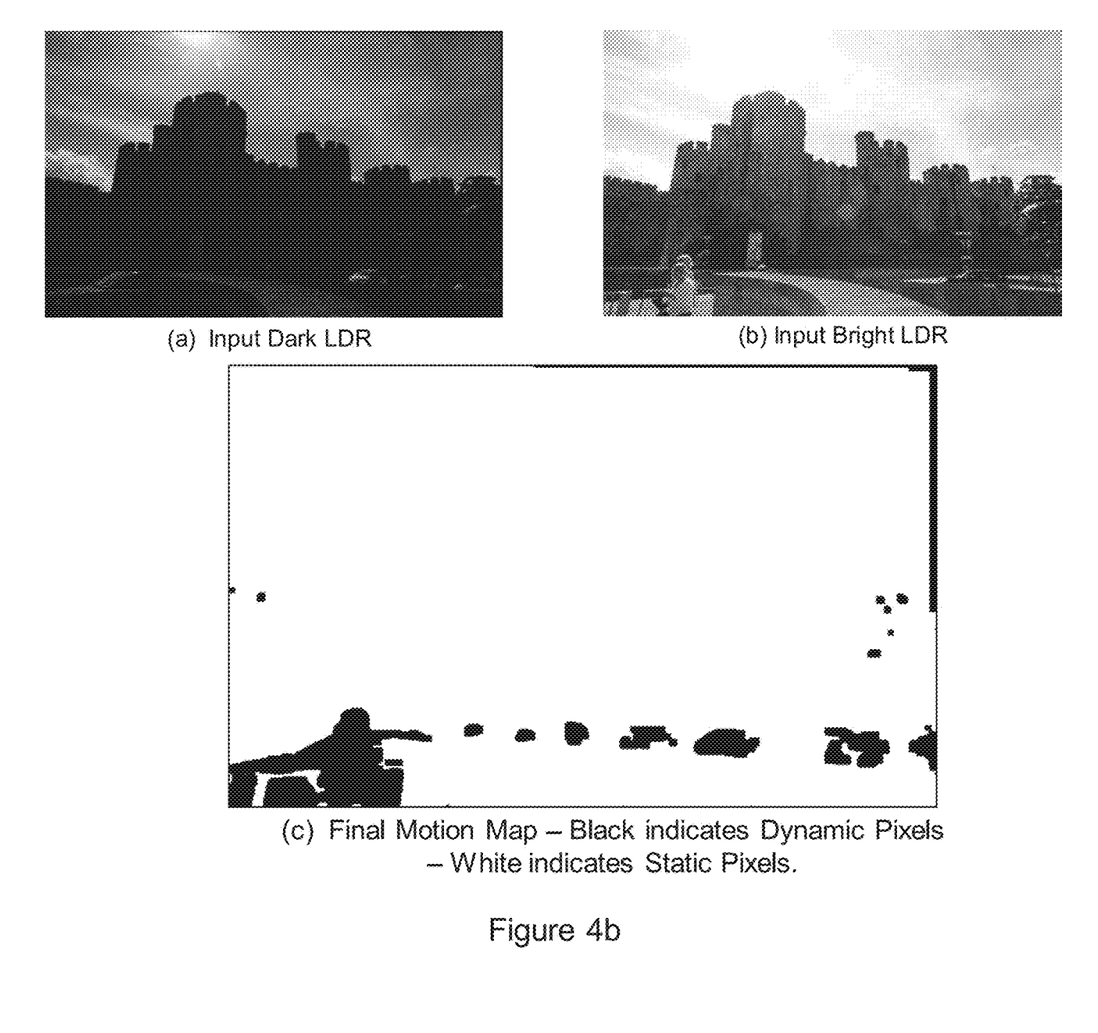
FIG. 4b is another example of a final motion map M.

Examples of the final motion map M are shown in FIGS. 4a-4b.

FIG. 4a illustrates the visual impact of the logistic function-based manipulation of the difference image on the final motion map. Picture (a) shows a ground truth motion map. Picture (b) shows a motion map without manipulation. Picture (c) shows a motion map with the proposed manipulation.

In FIG. 4b, picture (c) shows a final motion map obtained based on input images (a) and (b). In picture (c), black indicates dynamic Pixels and white indicates static pixels.

Figure 5:
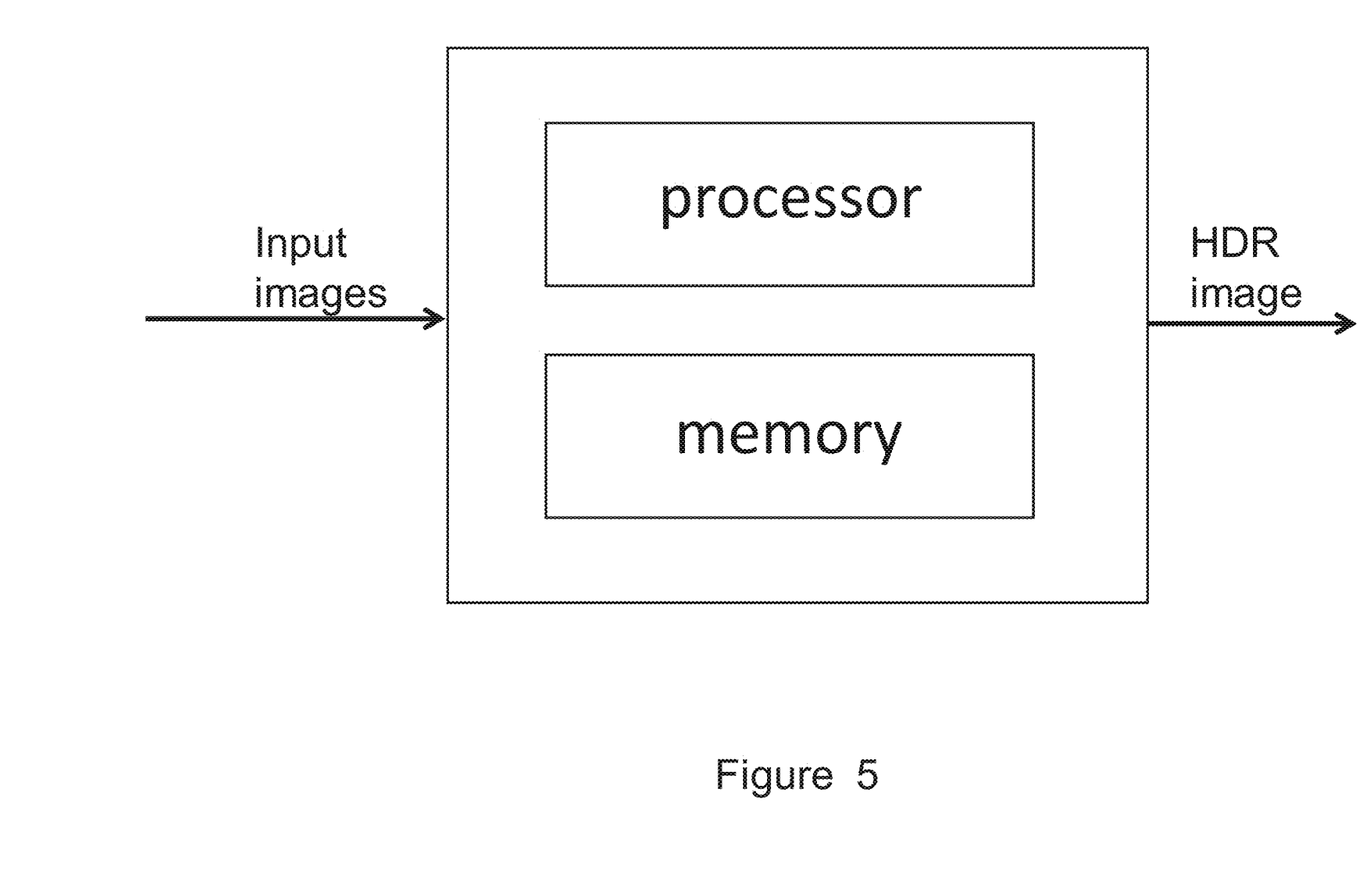
FIG. 5 schematically shows an example of an apparatus for generating a HDR image.

FIG. 5 shows an embodiment of apparatus for generating an HDR image. The apparatus generally comprises a processor that is configured to perform the steps 101-103. In an example, the processor is configured to perform the aforementioned steps 201-204. In particular, the processor is configured to perform step 202 as described in step 301-307.

Figure 6:
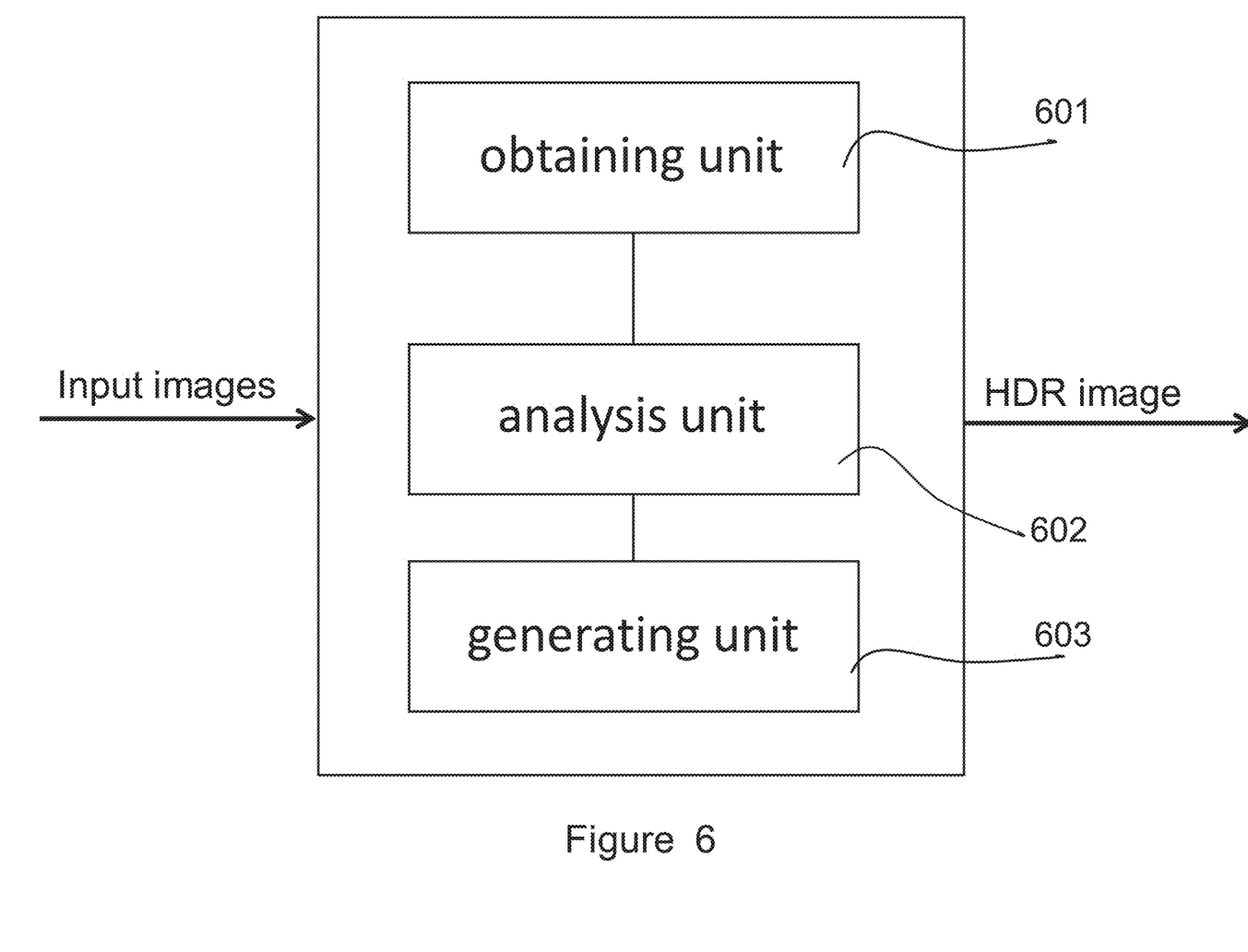
FIG. 6 schematically shows an example of another apparatus for generating a HDR image.

FIG. 6 shows another embodiment of apparatus for generating a HDR image. The apparatus comprises:

an obtaining unit 601 configured to perform the aforementioned step 101;

an analysis unit 602 configured to perform the aforementioned step 102; and a generating unit 603 configured to perform the aforementioned step 103.

In an example, the analysis unit 602 is configured to perform the aforementioned steps 202-203. In particular, the analysis unit 602 is configured to perform step 202 as described in step 301-307.

The subject matter described above can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

What is claimed is:

1. A method for generating a High Dynamic Range (HDR) image, the method comprising:

obtaining a set of two or more input images, the two or more input images including a reference image and one or more non-reference images;

performing, for each of the one or more non-reference images, an image analysis comprising:

generating a difference image of the non-reference image by one of subtracting the non-reference image from the reference image and subtracting the reference image from the non-reference image;

generating a contrast-enhanced difference image by applying a contrast enhancing transformation to the difference image;

assessing, for each region of a plurality of regions of the non-reference image, whether the region of the non-reference image and a corresponding region of the reference image show the same image content, wherein the assessing is on the basis of the contrast-enhanced difference image; and declaring the region of the non-reference image as valid or as invalid based on the assessment;

generating the HDR image by fusing the reference image and the one or more non-reference images, wherein the fusing comprises, for each of the one or more non-reference images, disregarding the invalid regions of the respective non-reference image, wherein the assessing whether the region of the non-reference image and a corresponding region of the reference image show the same image content comprises: comparing an intensity value of a corresponding region of the difference image against a threshold, wherein the method further includes determining the threshold based on the non-reference image, and the determining the threshold comprises:

generating a histogram of the non-reference image, wherein the histogram includes multiple bins and each of the multiple bins covers a same range of intensity and has a bin center;

calculating a decrease of each bin of the multiple bins, wherein the decrease is a difference between numbers of pixels respectively at centers of two adjacent bins of the multiple bins;

identifying a bin from the multiple bins, where the decrease of the identified bin is larger than decrease of any non-identified bin of the multiple bins; and calculating the threshold according to an intensity of a point in the middle of two bin centers of the identified bin and its next bin.

2. The method of claim 1, wherein applying the contrast enhancing transformation to the difference image comprises, for each region of a plurality of regions of the difference image, applying a sigmoid function to an intensity value of the region.

3. The method of claim 2, further comprising adapting the contrast enhancing transformation according to a characteristic of the reference image and the non-reference image.

4. The method of claim 3, wherein the characteristic includes a color difference between the reference image and the non-reference image.

5. The method of claim 1, wherein the image analysis further comprises performing a morphology operation on the invalid regions of the respective non-reference image.

6. The method of claim 5, the morphology operation includes:

counting the invalid pixels inside a first window in the contrast-enhanced image, wherein the first window is centered on an invalid pixel; and at least one of declaring the invalid pixel on which the first window is centered as valid or invalid according to the counted number of invalid pixels inside the first window; and defining a second window next to an invalid pixel in the contrast-enhanced image; and declaring every pixel inside the second window as invalid if a central pixel of the second window is an invalid pixel.

7. An apparatus for generating a High Dynamic Range, HDR, image, comprising a processor configured to perform the steps of claim 1.

8. An apparatus for generating a High Dynamic Range, HDR, image, comprising a processor; and a non-transitory computer readable medium storing instructions that when executed by the processor perform the following steps obtaining a set of two or more input images, the two or more input images including a reference image and one or more non-reference images;

performing, for each of the one or more non-reference images, an image analysis which comprises, for each region of a plurality of regions of the non-reference image, assessing whether the region of the non-reference image and a corresponding region of the reference image show the same image content and declaring the region of the non-reference image as valid or as invalid based on the assessment; and generating the HDR image by fusing the reference image and the one or more non-reference images, wherein the fusing comprises, for each of the one or more non-reference images, disregarding the invalid regions of the respective non-reference image;

wherein the image analysis comprises:

generating a difference image of the non-reference image by subtracting the non-reference image from the reference image or vice versa; and generating a contrast-enhanced difference image by applying a contrast enhancing transformation to the difference image;

wherein the assessing is on the basis of the contrast-enhanced difference image, wherein the assessing whether the region of the non-reference image and a corresponding region of the reference image show the same image content comprises:

comparing an intensity value of a corresponding region of the difference image against a threshold, wherein the method further includes determining the threshold based on the non-reference image, and the determining the threshold comprises:

generating a histogram of the non-reference image, wherein the histogram includes multiple bins and each of the multiple bins covers a same range of intensity and has a bin center;

calculating a decrease of each bin of the multiple bins, wherein the decrease is a difference between numbers of pixels respectively at centers of two adjacent bins of the multiple bins;

identifying a bin from the multiple bins, where the decrease of the identified bin is larger than decrease of any non-identified bin of the multiple bins; and calculating the threshold according to an intensity of a point in the middle of two bin centers of the identified bin and its next bin.

9. A non-transitory computer readable memory storing program code means that when executed on by a processor performs the following steps:

obtaining a set of two or more input images, the two or more input images including a reference image and one or more non-reference images;

performing, for each of the one or more non-reference images, an image analysis comprising:

generating a difference image of the non-reference image by one of subtracting the non-reference image from the reference image and subtracting the reference image from the non-reference image;

generating a contrast-enhanced difference image by applying a contrast enhancing transformation to the difference image;

assessing, for each region of a plurality of regions of the non-reference image, whether the region of the non-reference image and a corresponding region of the reference image show the same image content, wherein the assessing is on the basis of the contrast-enhanced difference image; and declaring the region of the non-reference image as valid or as invalid based on the assessment;

generating the HDR image by fusing the reference image and the one or more non-reference images, wherein the fusing comprises, for each of the one or more non-reference images, disregarding the invalid regions of the respective non-reference image, wherein the assessing whether the region of the non-reference image and a corresponding region of the reference image show the same image content comprises: comparing an intensity value of a corresponding region of the difference image against a threshold, wherein the method further includes determining the threshold based on the non-reference image, and the determining the threshold comprises:

generating a histogram of the non-reference image, wherein the histogram includes multiple bins and each of the multiple bins covers a same range of intensity and has a bin center;

calculating a decrease of each bin of the multiple bins, wherein the decrease is a difference between numbers of pixels respectively at centers of two adjacent bins of the multiple bins;

identifying a bin from the multiple bins, where the decrease of the identified bin is larger than decrease of any non-identified bin of the multiple bins; and calculating the threshold according to an intensity of a point in the middle of two bin centers of the identified bin and its next bin.

10. The non-transitory computer readable memory of claim 9, wherein applying the contrast enhancing transformation to the difference image comprises, for each region of a plurality of regions of the difference image, applying a sigmoid function to an intensity value of the region.

11. The non-transitory computer readable memory of claim 10, further comprising adapting the contrast enhancing transformation according to a characteristic of the reference image and the non-reference image.

12. The non-transitory computer readable memory of claim 11, wherein the characteristic includes a color difference between the reference image and the non-reference image.

13. The non-transitory computer readable memory of claim 9, wherein the image analysis further comprises performing a morphology operation on the invalid regions of the respective non-reference image.

* * * * *